Dec. 20, 1949          H. R. LARSON          2,491,669
ULTRA HIGH FREQUENCY ATTENUATOR
Filed April 16, 1945          3 Sheets-Sheet 1
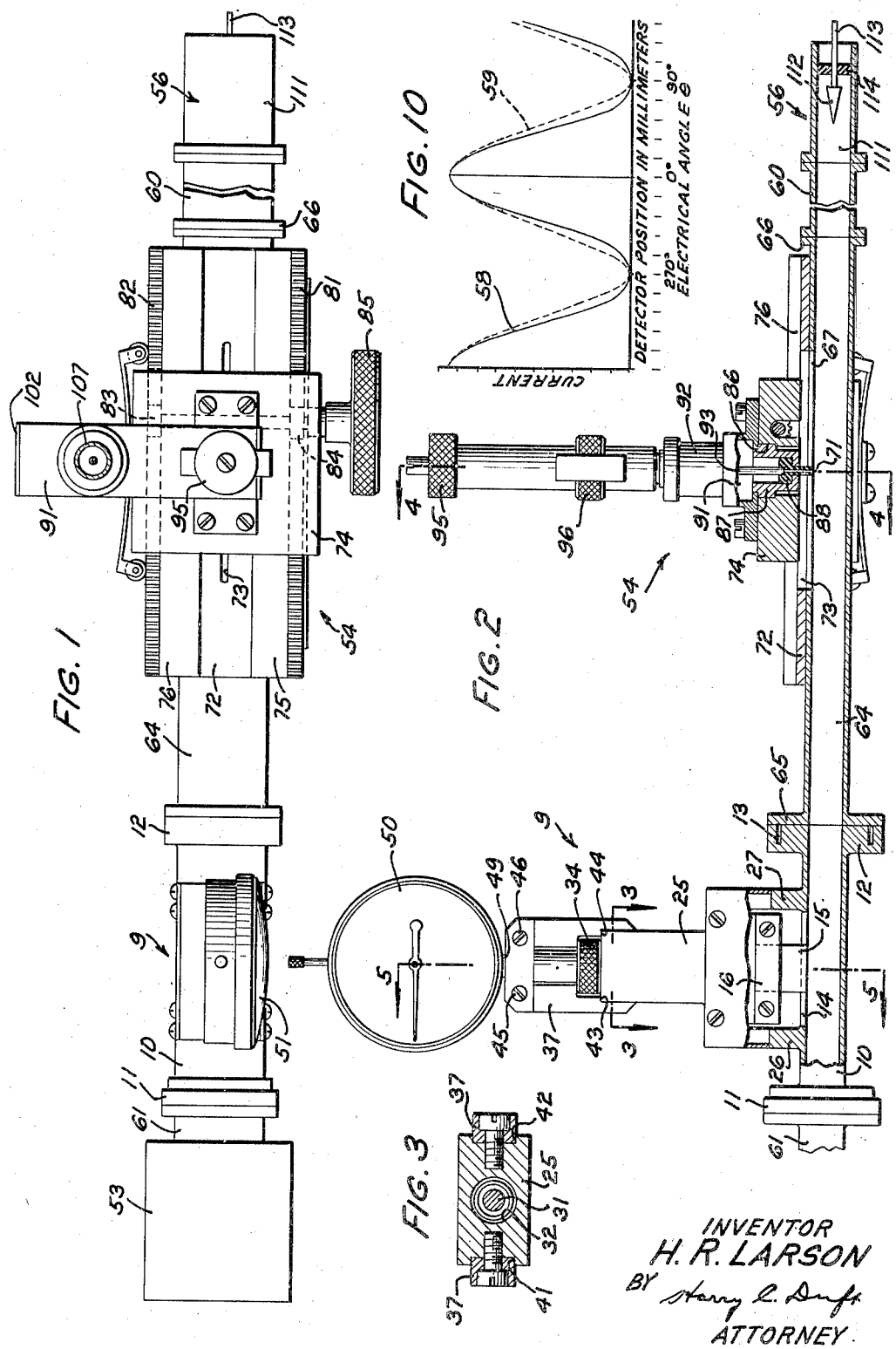
INVENTOR
H. R. LARSON
BY Harry L. Duft
ATTORNEY Dec. 20, 1949  H. R. LARSON  2,491,669
ULTRA HIGH FREQUENCY ATTENUATOR
Filed April 16, 1945  3 Sheets-Sheet 2
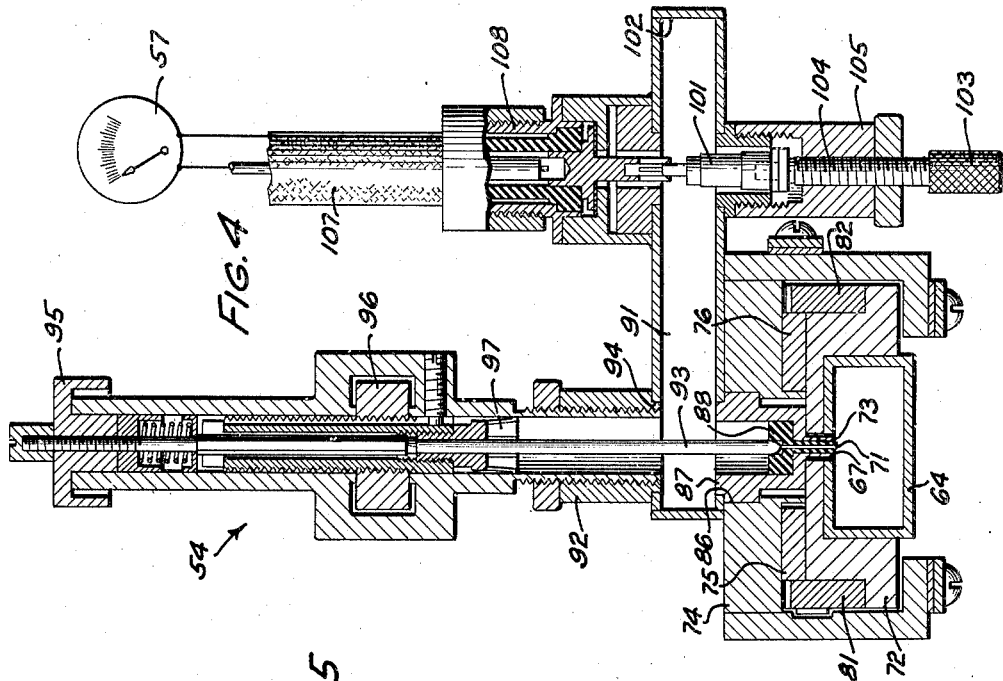
INVENTOR
H. R. LARSON
BY [signature]
ATTORNEY

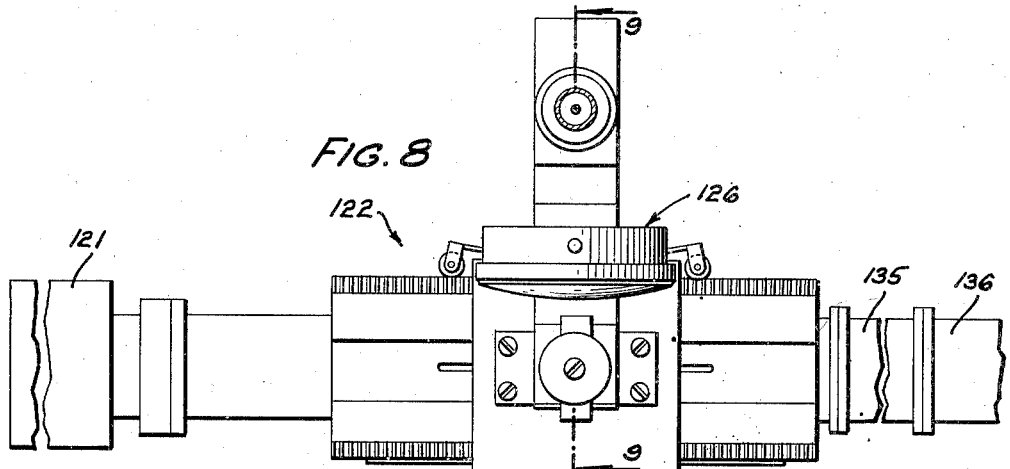
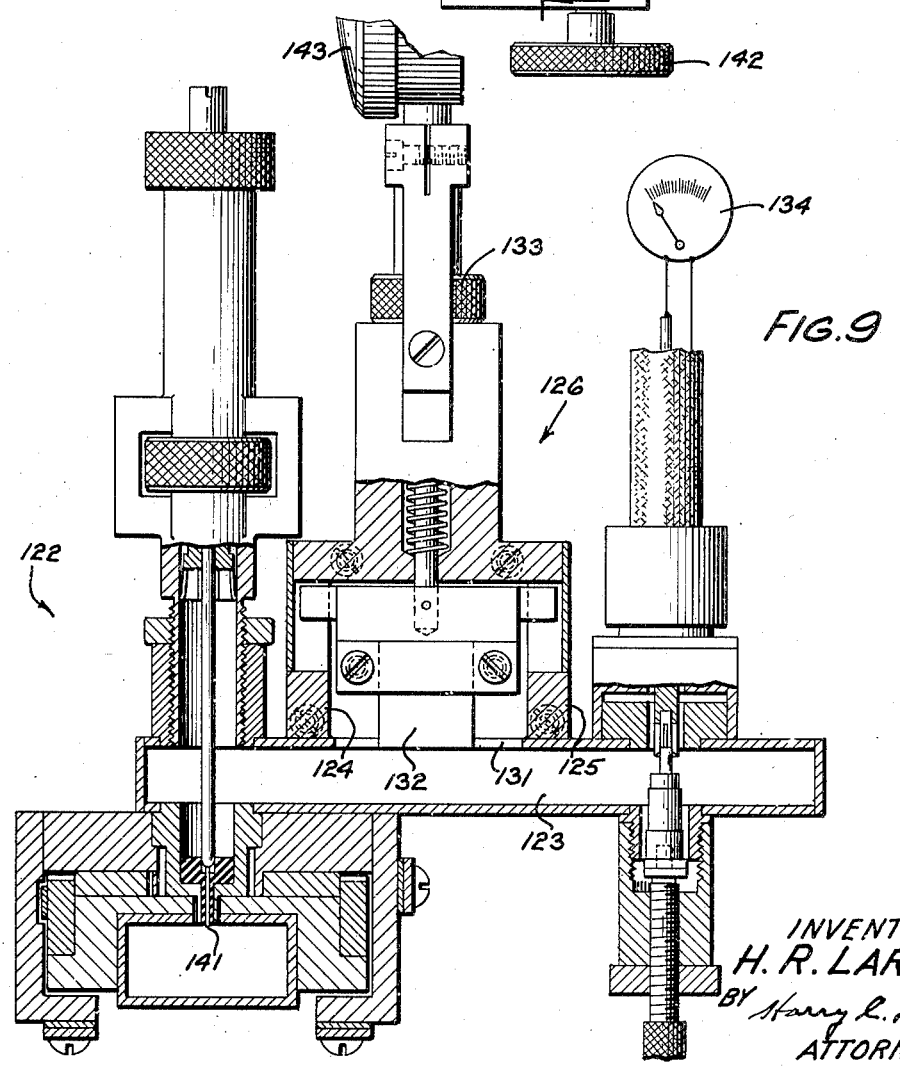

Patented Dec. 20, 1949

2,491,669

UNITED STATES PATENT OFFICE 2,491,669

ULTRA HIGH FREQUENCY ATTENUATOR

Harry R. Larson, Chicago, Ill., assignor to Western Electric Company, Incorporated, New York, N. Y., a corporation of New York Application April 16, 1945, Serial No. 588,702

2 Claims. (Cl. 178—44)

This invention relates to an apparatus for measuring electrical properties, and more particularly to a radio frequency attenuator.

Three important reasons dictate the necessity for precise impedance matching in ultra-high frequency systems. Power transfer is at a maximum when impedances are matched. Mismatched impedances in an ultra-high frequency system will cause undesirable reflections of the waves traveling through the component parts. Reenforcement of the incident waves by these reflections may cause dielectric breakdown in the system. Reflections will also cause frequency drift and may cause the oscillator tube to completely cease functioning. It is well known that the standing wave ratio in an ultra-high frequency system is a function of the impedance relationships in the system and that a ratio higher than unity indicates an impedance mismatch.

The existence of mismatched impedances in ultra-high frequency systems is ordinarily ascertained from standing wave observations made with what is known in the art as a traveling standing wave detector inserted into the line and electrically connected to a current indicating device, usually a micro-ammeter, to indicate the rectified output of the detector. The rectifying element of the detector is in most cases a silicon crystal. Investigation has proved that the response of the crystal does not follow a square law nor a different but constant power (exponent) law. With rare exceptions, the crystal response follows a widely variable power law as the load on the crystal changes through the ranges involved in standing wave measurements. Neither a square law assumption nor a calibration based on a constant exponent law for the crystal will give the precise standing wave ratio measurements so urgently necessary in the refined micro-wave techniques of today, especially in radar.

Even if a careful and laborious point-by-point calibration of the crystal is made, it may change in unpredictable direction and magnitude from day to day as a result of comparatively slight changes in conditions under which it is used. Frequently changes take place for which no assignable cause has been found. It is obvious that a method of standing wave measurement which is independent of the crystal characteristics is not only desirable but essential if precise measurements are required.

Objects of this invention are to provide an apparatus for very precise measurement of electrical characteristics.

In accordance with one embodiment of this invention a continuously variable radio frequency attenuator, with a micrometric depth adjustment and a depth gage, calibrated directly in standing wave ratios or decibels, is inserted into a longitudinal slot cut into a wave guide section. The attenuating element is a rectangular piece of resistive strip half a wave length long, or if a higher degree of attenuation is desired its length may be an integral number of half-wave lengths. This length is selected to avoid phase effects on the attenuation.

The attenuator is inserted in a system between an ultra-high frequency generator and a traveling standing wave detector which is connected to the unknown section under test which in turn is coupled to a totally absorbing termination. The probe of the detector is moved until the minimum current reading is indicated on the detector meter, then the probe is moved to the point of highest current. Sufficient attenuation is then introduced to bring the detector meter needle back to the minimum current value first noted. The calibrated attenuator then yields the value of the standing wave ratio directly.

A complete understanding of the invention may be had by reference to the following description taken in conjunction with the accompanying drawings, in which Fig. 1 is a plan view of an apparatus embodying the invention and showing a method of connecting the unknown section in the line;

Fig. 2 is a front elevation of the apparatus shown in Fig. 1 with part in section;

Fig. 3 is a cross-sectional view of the attenuator taken on the line 3—3 of Fig. 2;

Fig. 4 is a vertical section of the detector taken on line 4—4 of Fig. 2;

Fig. 5 is a vertical section of the attenuator taken on line 5—5 of Fig. 2 with a fragmentary elevational view of the meter;

Fig. 6 is a central longitudinal sectional view of the attenuator taken on the line 6—6 of Fig. 5;

Fig. 7 is a horizontal sectional view of the attenuator taken on the line 7—7 of Fig. 6;

Fig. 8 is a plan view of a modified form of the apparatus showing the attenuator inserted between the probe and the crystal of the detector;

Fig. 9 is a sectional view of the apparatus shown in Fig. 8 taken on the line 9—9 of Fig. 8 with part shown in elevation, and Fig. 10 is a graphic illustration showing the relationship of the observed current curve to the $\cos^2$ curve.

The apparatus embodying the invention comprises an ultra-high frequency source of energy such as a magnetron oscillator or a velocity modulated tube generator, a movable detector for measuring the energy at different points along a wave guide, and an attenuator by means of which the energy in the wave guide may be attenuated so that the detector when set at the maximum point of a standing wave may be made to indicate the same value as at a minimum point and the relative value of reflected energy may then be determined by the amount of attenuation.

A radio frequency attenuator indicated generally at 9 is built upon a section of rectangular wave guide 10, which is provided with suitable coupling flanges 11 and 12 to permit the connection of the section into an ultra-high radio frequency system. Transverse leakage of power at the joints is prevented by a circular groove 13 formed into the face of the flange which acts as a radio frequency choke. A longitudinal slot 14 of proper size is cut into one of the wide sides of the guide to allow an attenuating element 15, a half wave length long, to be inserted into the wave guide and retracted therefrom at will. If a higher degree of attenuation is desired, the length of the element 15 may be increased an integral number of half wave lengths. The attenuating element, a rectangular piece of 200 ohms per square inch resistive strip capable of absorbing ultra-high frequency energy, is clamped with the plane of the strip parallel to the length of the wave guide, between a block 16 and a cross bar 17 having extended lugs 21 and 22 slidably engaging two vertical guide slots 23 and 24 formed in the legs of a main support member 25 having an inverted U-shaped lower portion which is firmly mounted on two rectangular uprights 26 and 27 secured to the wave guide 10 at either end of the slot 14.

Vertical reciprocation is imparted to the attenuating element by fastening the cross bar 17 to the lower end of a vertically disposed rod 31 reciprocably supported in a bore 32 formed in the main support member 25, the lower end of the bore terminating in an aperture 33 which is reduced in diameter to guide the downwardly extending lower end of the rod. The upper end of the rod is threaded to cooperate with a thumb nut 34 which, when manually turned, will impart a gradual vertical movement to the rod either up or down, depending on the rotational direction of the thumb nut. An annular shoulder 35 on the rod 31 slidably engages the walls of the bore 32 to firmly guide the rod. The portion of the rod extending downward from the shoulder 35 is reduced in diameter to provide room between the wall of the bore and the rod for a helical compression spring 36 which encircles the rod between the shoulder 35 and the lower end of the bore. This spring exerts a constant upward pressure against the shoulder 35 which pressure is transmitted through the rod 31 to the thumb nut 34, the upper part of which is urged against the lower side of the horizontal portion of an inverted U-shaped gage clamping fixture 37, maintaining firmness of control and preventing backlash. Lateral displacement of the clamping fixture is prevented by fitting the lower part of the legs of the clamp into vertical grooves 41 and 42 formed in the main support 25 to which the clamp is secured. To limit the vertical position of the gage clamp 37, the legs of the clamp have shoulders 43 and 44 formed thereon to abut the top of the main support 25. Space between the top of the main support 25 and the yoke of the clamp is provided to accommodate the thumb nut 34.

Clamping pressure applied laterally by two screws 45 and 46 grips the downwardly extending bushing 49 of a dial type gage 50 in the circular enlargement of a slot 51 cut lengthwise through the yoke of the clamp 37, the opposite faces of the slot operating as a vise. An actuating plunger 52 on the gage 50 passing through the bushing 49 bears against the flat top of the rod 31 so that the gage will respond to and indicate the vertical position of the rod 31 with reference to a zero point. It is apparent that operating the thumb nut 34 will impart vertical displacement to the rod which in turn will either lower the attenuating element 15 into the wave guide 10 through the slot 14 or retract it depending upon the direction of rotation of the thumb nut. It is further evident that the depth to which the attenuating element is lowered into the wave guide 10 will be indicated on the gage 50.

The degree of attenuation introduced is a function of the depth that the attenuating element reaches in the wave guide. The ratio between two power levels of standing waves is made a function of the degree of attenuation that is introduced to reduce the upper power level to the value of the lower. This permits the device indicating the depth of the attenuating element (in this case the dial type gage) to be calibrated directly in standing wave ratios or in decibels.

The attenuator 9 may be calibrated by coupling it between an ultra-high frequency generator 53, such as a magnetron oscillator, a velocity modulated tube generator, or the like, and an ultra-high frequency detector indicated generally at 54 and described later herein. For the purpose of calibration, it is not necessary that the probe of the detector be horizontally moved, because during the calibration standing waves are not present in the apparatus and the power level at any given instant is the same through the wave guides of the apparatus. The load characteristic of the crystal rectifier in the detector used for calibrating the attenuator should be accurately determined beforehand.

Since the crystal response does not follow the square law of power, its response to the various power levels must be corrected for each observation to give a true indication of the power level observed. The load characteristic of the crystal may be determined by making a traverse of approximately a wave length at the frequency at which the crystal is to be used with a standing wave detector in a line terminated with a short circuit so that the minima will be zero. The response of the crystal is observed at intervals of 1 millimeter and a curve 58 is plotted with the current readings representing the crystal response as ordinates and the millimetric readings of the detector position as the abscissae. The linear measure of the detector position is converted into the electrical angle at each point using the maximum point as the origin as indicated in Fig. 10. A $\cos^2$ curve 59 having the same origin and maximum amplitude is plotted using the maximum observed current times $\cos^2\theta$ as the ordinates and the $\angle \theta$ as the abscissae, $\theta$ being the electrical angle. The corrected response of the crystal for any given angle will be the ordinate of the $\cos^2$ curve at that angle.

A totally absorbing termination 56, hereinafter described, is coupled to the other end of the standing wave detector 54. A micro-ammeter 57 is connected to the detector 54 to measure the rectified output of the crystal. Corresponding readings of current and attenuator settings are made through the range of the attenuator. The current values are then corrected in accordance with the known characteristics of the crystal and the standing wave ratios or the decibels corresponding to the readings are computed and may be marked directly on the dial of the gage 50. The calibration of the attenuator will be valid indefinitely, and will thereafter be unaffected by any changes in the crystal load characteristic or by the substitution of another crystal with different load characteristics.

To determine the impedance of an unknown section 60 of an ultra-high frequency system, the output of the radio frequency generator 53 is coupled to the input of the calibrated radio frequency attenuator 9 through a suitable transmission line or wave guide 61. The output of the attenuator 9 is coupled to one end of a traveling standing wave detector shown generally at 54 which preferably should comprise a section of wave guide 64 with coupling flanges 65 and 66 at both ends, and provided with a slot 67 into which the end of a traveling probe 71 extends. Fixed to the wave guide 64 is a bed block 72 having a slot 73 therein which coincides with the slot 67. A carriage block 74 rides upon a pair of ways 75 and 76 secured to the bed block 72 which also supports a pair of racks 81 and 82, which in combination with pinion gears 83 and 84 actuated by a knurled knob 85 provide variable horizontal movement for the carriage block 74. Fitted into a circular aperture 86 of the carriage block is a bushing 87 which houses a probe insulating bushing 88. The bushing 87 opens upwardly into a pickup wave guide 91 disposed at right angles to the wave guide 64, and secured to the carriage block 74.

A housing 92 for supporting the mechanism for vertically adjusting a probe shaft 93, to which the probe 71 is fixed, is mounted on the top of the pickup wave guide 91 directly over a circular aperture 94 formed in the wave guide 91. Penetration of the probe 71 into the wave guide 64 is controlled by a knurled nut 95. Another knurled nut 96 controls a coaxial tuner 97 to match the probe to the wave guide 91. An independently mounted tunable crystal 101 is located in the pickup guide 91 approximately a half wave length from a fixed back plate 102. The crystal is tuned by means of a knurled head 103 on the adjustable screw 104 mounted in a housing 105 attached to the pickup guide 91. The output of the crystal is connected to a micro-ammeter 57 through a coaxial cable 107 and a coaxial terminal 108. The other end of the detector 54 is coupled to one end of the unknown section 60 under test, which may be a section of wave guide, a junction box or any part of a system, the impedance of which is to be observed. The unknown section is coupled at its other end to the totally absorbing termination indicated generally at 56 and which comprises a short length of flanged wave guide 111 in which a triangular piece of resistive strip 112 is secured to the end of a reciprocably adjustable rod 113 which passes through an insulating bushing 114.

Electro-magnetic waves produced by the oscillations of the radio frequency generator 53 are transmitted through the wave guides of the various components, passing through the attenuator guide section 10 first, then through the guide section 64 of the detector 54, then through the unknown section 60, finally striking the termination 56.

If the impedance of the unknown section matches that of the system, maximum power transfer will be effected and no reflection will take place, but if the impedance of the unknown section does not match the system impedance, then reflections of the original waves will be produced. The amount of reflection is dependent upon the degree of mismatch between the impedance of the unknown section and that of the system. These reflections cause standing waves to be set up in the wave guides. The detector probe 71 is moved horizontally by means of the knob 85 along the horizontal slot 67 until the minimum current is indicated on the micro-ammeter 57 in the detector circuit and this value is noted. Next, the detector probe 71 is again moved along the slot until the maximum current is shown on the meter 57. Attenuation is then provided by turning the thumb screw 34 of the attenuator 9 which will cause the attenuating element 15 to enter the wave guide 10 through the slot 14. Sufficient attenuation is introduced to bring the needle of the meter 57 back to the minimum reading first noted. The calibrated dial gage 50 on the attenuator 9 will then indicate the standing wave ratio.

The standing wave ratio is thus directly observed. Laborious and time-consuming calculations are unnecessary, and the results are extremely accurate because they are independent of the shape of the crystal characteristic. The crystal follows essentially the same pattern for both the ascending and descending branches of its load characteristic. The consequences of inconsistencies of the current indicating meter are also eliminated since both initial and final readings are made at the same point of the meter scale. This radio frequency attenuator is phase insensitive due to the attenuating element 15 being a half wave length or an integral number of half-wave lengths thus enabling it to intercept the equivalent of a full loop or loops of the standing wave regardless of its position in the guide with respect to the standing waves.

Although the method described is for use in low power systems, it can be successfully used in high power systems by inserting the radio frequency attenuator between the probe of the standing wave detector and the rectifier element of the standing wave detector. Between these points the power is relatively low and the attenuating element will not burn up. An embodiment of this modification of the invention herein is disclosed in Figs. 8 and 9 wherein the output of a source 121 of ultra-high frequency oscillations, which may be a magnetron oscillator or a velocity modulated tube generator, is connected to one end of a standing wave detector, shown generally at 122, which comprises all the elements of the one indicated at 54. In addition, however, the upper surface of the pickup wave guide 123 of the standing wave detector 122 is provided with a pair of uprights 124 and 125 to support a radio frequency attenuator indicated generally at 126 and which is of the same construction as the radio frequency attenuator indicated at 9, except that the pickup wave guide 123 is substituted for the wave guide 10 of the formerly described attenuator. A slot 131 is formed in the pickup guide 123 to receive an attenuating element 132 which may be inserted into and retracted from the guide 123 by means of a continuously variable vertical adjustment controlled by thumb nut 133, the detail of this adjustment being the same as that of the radio frequency attenuator indicated at 9. The length of the attenuating element is one-half wave length to prevent phase sensitivity. A microammeter 134 is connected to the output of the crystal rectifier of the standing wave detector 122 to measure the value of the rectified current. The other end of the detector 122 is coupled to one end of an unknown section 135 to be tested, the other end of which is coupled to a totally absorbing termination 136 which is in all respects the same as the one shown generally at 112.

This method of impedance testing is the same as that described in the first embodiment of this invention. Electromagnetic waves produced by the radio frequency generator 121 pass through the wave guides of the detector 122 and the unknown section 135, striking the termination 136. If the unknown section 135 possesses a characteristic impedance that permits unopposed passage of all the power entering it, then the incident waves striking the termination 136 will be absorbed by the termination; however, should the unknown section offer opposition to maximum power transference, then the incident waves will be reflected causing standing waves to be produced in the wave guides of the apparatus.

The probe 141 of the detector 122 is moved horizontally by means of a knob 142 until a minimum current reading is indicated on the meter 134. Obviously, this will be the point where the probe 141 intercepts the standing wave at its lowest power level. Then the probe is moved until it intercepts the standing wave at a point of maximum power; this will be indicated by maximum current reading on the meter 134. The attenuating element 132 is then lowered into the pickup guide 123 by turning the thumb nut 133 introducing sufficient attenuation to reduce the value of the maximum current until the meter 134 indicates the minimum current first noted. A calibrated gage 143 on the attenuator 126 will then indicate directly the standing wave ratio, or if it has been so calibrated, in decibels.

What is claimed is:

1. A radio frequency attenuator comprising a section of a wave guide, coupling flanges integral with said wave guide section for coupling the wave guide section in a high frequency system, one of said flanges having an annular groove formed in the face thereof to form a radio-frequency choke, said wave guide section having a longitudinal slot in one of the sides thereof, a resistive attenuating element movable into said wave guide section through said slot without making electrical contact with said wave guide section, manually adjustable means for moving said attenuating element into and retracting it from said wave guide section, and calibrated indicating means for indicating the depth of the penetration of the attenuating element in the wave guide section, said attenuating element being rectangular in shape and having a length of an integral number of half-wave lengths of the wave to be attenuated.

2. An ultra-high frequency attenuator comprising a section of hollow wave guide having connection means integral therewith for coupling the section into an ultra-high frequency system, said connection means having an annular hollow portion therein to provide an ultra-high frequency choke for preventing energy loss at the coupling, an adjustable attenuating means movable into and out of the section through a slot therein, said attenuating means extending longitudinally a half-wave length or an integral multiple thereof and being of uniform resistive character per unit of length, and an indicating means secured to the attenuating means for indicating the position thereof as a measurement of the attenuation introduced into the ultra-high frequency system.

HARRY R. LARSON.

REFERENCES CITED

The following references are of record in the file of this patent:

UNITED STATES PATENTS

| Number | Name | Date |
|---|---|---|
| 2,151,157 | Schelkunoff | Mar. 21, 1939 |
| 2,197,123 | King | Apr. 16, 1940 |
| 2,337,934 | Scheldorf | Dec. 28, 1943 |
| 2,358,462 | Mahren | Sept. 19, 1944 |
| 2,376,785 | Krasik | May 22, 1945 |
| 2,395,851 | Cork | Mar. 5, 1946 |
| 2,407,267 | Ginzton | Sept. 10, 1946 |
| 2,441,598 | Robertson | May 18, 1948 |